C. B. STEVENS.
Wheel Plows.
No. 139,032. Patented May 20, 1873.
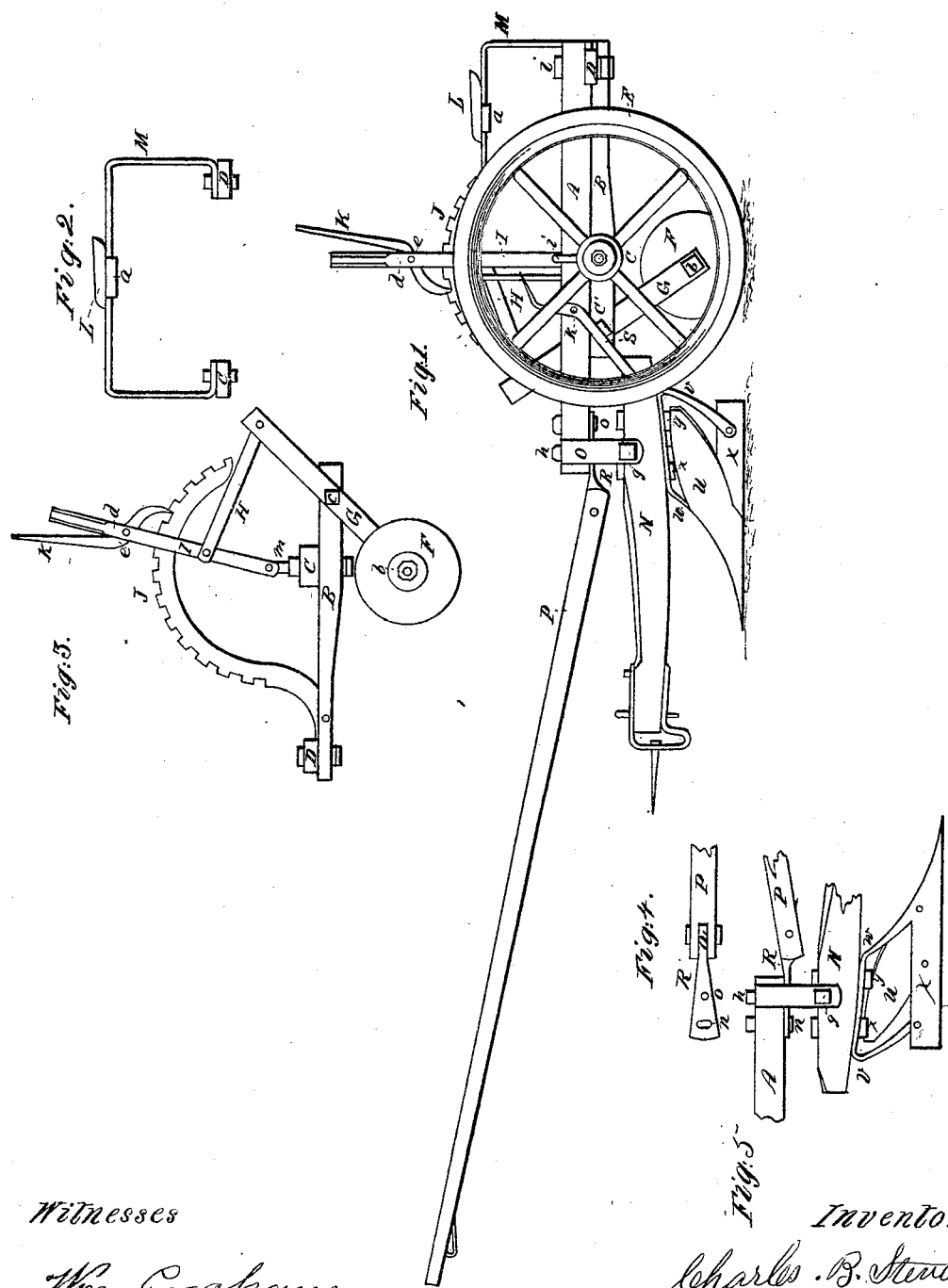
Witnesses
Wm Graham
W. B. Collins
Inventor
Charles B. Stevens

UNITED STATES PATENT OFFICE.

CHARLES B. STEVENS, OF DONNELSON, IOWA.

IMPROVEMENT IN WHEEL-PLOWS.

Specification forming part of Letters Patent No. 139,032, dated May 20, 1873; application filed January 16, 1873.

*To all whom it may concern:*

Be it known that I, CHARLES B. STEVENS, of Donnelson, in the county of Lee and State of Iowa, have invented certain Improvements in Riding-Plows, of which the following is a specification:

My invention consists of a combination of levers, wheels, and sliding seat, in such a manner as to enable any one to guide and operate any breaking device to which it may be attached, and also to keep the same device or plow in a steady position and at a regular depth in soddy or hard ground, and also to extricate the plow from any root or obstruction which it may run into while operating by throwing the weight of the operator backward upon the machine, which causes the heel of the plow to rise, and then backing, which forces the plow out in the same manner which it entered.

Figure 1 is a side view of the machine embodying my invention. Fig. 2 is a representation of seat and support. Fig. 3 is a view of the leveling apparatus, which is at the right hand of Fig. 1. Fig. 4 is a representation of the tongue device. Fig. 5 is right-hand view of Fig. 1, showing the manner in which the plow is fastened to the machine, and also the upright or stanchion of the plow.

A is main frame-piece, which should be made heavy enough to bear the weight of the plow when it is thrown out of the ground. B is right-hand frame-piece, which is fastened to the under side of axle C and cross-tie D. E is furrow-wheel, which is to be substantially made, so as to carry the greater portion of the weight of the machine and operator, so that the land-side wheel F will have but very little weight to bear. The land-side wheel F should be made of solid wood, and fastened to the lever G by the square-headed bolt *b*. H is connecting-rod, connecting the lever G to the lever I, which is slotted at *c* for admission of bar J and catch K. J is notched for the reception of the catch K. When the lever I is thrown backward, the catch K throws itself out of the notches on J, and when it (I) is thrown forward, the catch K drops into the notches on J and arrests the further downward motion of levers G and I. When the levers G and I are thrown forward, the land-side wheel F is thrown back in a line with the furrow-wheel E, and lowering the right side of the machine in proportion to the depth that the furrow-wheel E sinks in the furrow, which causes the plow to run level or on its bar, at the pleasure of the operator. When the lever I is thrown backward, the lever G is brought into a perpendicular position forward of the true working-line, which causes the machine to cant backward. This helps the operator to throw the plow out of the ground with more ease. When turning at the end, the lever G is drawn into a perpendicular position, and when ready to operate it is thrown down in an oblique position, as before described. L is the seat, which is fastened to frame M by a clamp in such a manner as to allow seat L to slide back and forth upon frame M, at the will of the operator. By sliding backward, the operator throws his weight on the hind portion of the machine, which causes the plow to rise out of the ground, and by sliding forward, the operator throws his weight forward, causing the plow to enter the ground. O is swing-clamp, which is firmly secured to main frame-piece A, and then clamps beam N just forward of the upright or stanchion V. The beam N swings in clamp O on the bolt *g*. When the plow is thrown out of the ground, the beam N swings on pivot *g*, which causes the point of the plow to drop and the heel to rise, leaving the plow in an oblique or natural position for entering the ground. R is a device, by which the tongue P is allowed to swing parallel or perpendicular. *o* is a pivot, on which device R swings, and *n* is a slot for the working of tongue P and device R sidewise. By this device the tongue P can be moved to one side or the other without throwing the plow to or from land, and at the same time to answer for turning or backing without altering the guiding qualities of the tongue P. S is a lever, which is fastened to main frame-piece A, and connects to beam N by a staple. This lever is to be used to help start the plow in at the starting-point, and also to keep the plow in the ground when it comes to depressions in the ground. V is stanchion or upright which connects the plow to beam N. The upright V should be made substantial and of one piece of iron, which should be flattened into a plate on top, in order to make a lateral draft-slot, $x$, and pivot-hole, $y$. The fore part of upright V should bend back when it reaches the top of the mold-board so as to form a half circle, and connect with beam N, thus leaving an opening, so that the trash passes backward and drops out sidewise, in this manner acting as a self-cleaner.

I claim as my invention—

The frame A B, supporting wheels E F and sliding-seat L, in combination with pivoted plow N, the seat being arranged so that the driver may throw his weight on the rear of the frame to assist in raising the plow, all substantially as described and for the purposes set forth.

CHARLES B. STEVENS.

Witnesses:
WM. GRAHAM,
W. B. COLLINS.